Jan. 23, 1962  W. L. POLAND  3,018,045
SIGNAL TRANSLATING SYSTEMS
Filed May 19, 1955  5 Sheets-Sheet 1

INVENTOR.
WILLIAM L. POLAND.
BY
HIS ATTORNEY.

Jan. 23, 1962 W. L. POLAND 3,018,045
SIGNAL TRANSLATING SYSTEMS
Filed May 19, 1955 5 Sheets-Sheet 3

INVENTOR.
WILLIAM L. POLAND.
BY
HIS ATTORNEY.

United States Patent Office 3,018,045
Patented Jan. 23, 1962

3,018,045
SIGNAL TRANSLATING SYSTEMS
William L. Poland, Bethel, Conn., assignor, by mesne assignments, to Schlumberger Well Surveying Corporation, Houston, Tex., a corporation of Texas
Filed May 19, 1955, Ser. No. 509,520
14 Claims. (Cl. 235—154)

This invention relates to systems for generating a signal varying as a desired function of one or more variable signals, and more particularly to such systems incorporating a function table wherein the function values are represented in binary form.

In electrical computing and control systems, a signal is often required which varies as a linear or non-linear function of two or more other signals. For example, in H. G. Doll Patent 2,463,362 for Automatic Control System for Vehicles," a non-linear function generator in a servo system is supplied with error and error-rate signals to generate a signal representing optimum position of a servomotor for speedy system response. In a servo system such as this, both the input and output signals will generally be of analog or continuously varying character. Conversion of the input signals from analog to digital form is then a prerequisite to obtaining advantages of accuracy, speed and ease of representation in a binary coded storage and read-out of the function. However, the expense of a separate analog-to-digital converter for each input signal, as well as a digital-to-analog converter for the output signal, is a serious obstacle to the practical realization of these advantages.

Accordingly, it is an object of this invention to provide a new and improved system for computing a function of one or more input variables, realizing the above-recited advantages of accuracy, speed and ease of function representation.

It is another object to provide for the generation of a function of one or more variable in an improved manner where such function does not conform to an explicit mathematical relationship.

Yet another object of this invention is to provide for an improved storage and accessability of function table values represented in binary code form.

A further object of the invention is to provide an efficient and relatively inexpensive system for translating analog signals in accordance with a table of binary code values.

These and other objects of the invention are realized by time sharing use of a binary-to-anolog converter utilized first in locating a function value in binary notation and then in converting this function value to an analog output signal. The converter is utilized with a magnetic drum memory first to convert a count of successive drum positions into anolog form for comparison with the analog values of each input signal and then to convert the binary function value located on the drum into an analog representation.

In one version of the system, each of the input variables and the output variable are represented by five place binary numbers. In a second version, the representing numbers have seven digit places. To accommodate the consequent increase in values recorded in the drum memory, provision is made for locating the output variable amongst a number of plural track groups recorded in side-by-side relation along the drum.

The invention will be better understood, and others of its objects and advantages perceived, from the following detailed description taken in conjunction with the drawings in which.

Figure 1A:
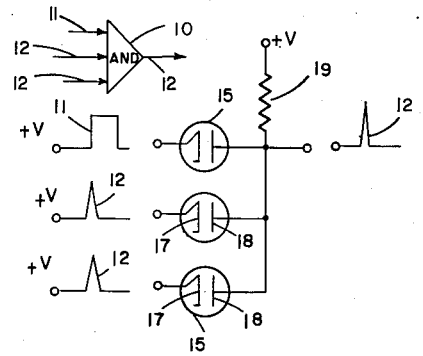
FIGS. 1A and 1B are schematic diagrams illustrating, respectively, a coincidence unit and a mixing unit which are used in the logical diagrams of the succeeding figures.

To facilitate an understanding of the invention, there is shown in FIG. 1A an exemplary coincidence unit 10, also known as an "and" unit, having three inputs and a single output. As illustrated, the coincidence unit 10 has applied thereto a single gate 11 and two pulses 12 which, if they occur simultaneously, will result in an output pulse 12. While a coincidence unit may be implemented by various means, including multiple grid electron tubes, diode circuitry is conveniently employed. Thus, three diodes 15 are arranged for application of a gate 11 and pulses 12 to their respective cathodes 17. Their plates 18 are connected in common to one side of a potential dropping resistor 19. The other side of the dropping resistor 19 is connected to a source of positive potential V. An output pulse 12 is derived from the common connection of the plates 18.

When each of the input signals 11, 12 has a peak potential V and is simultaneously applied, output pulse 12 likewise has a peak potential V. When an input pulse is not applied to any one of the cathodes 17, however, the associated diode will draw current through the resistor 19 holding the plates 18 and the output substantially at zero potential.

Figure 1B:
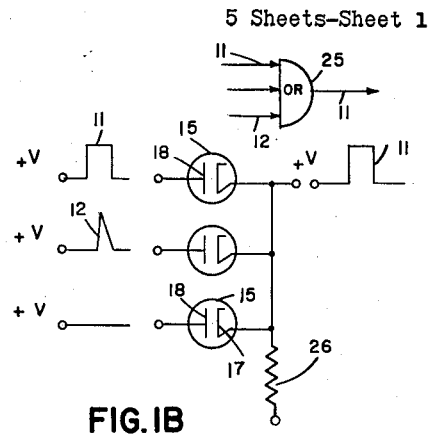

In FIG. 1B, an exemplary mixing unit 25 is shown, also known as an "or" unit. A gate 11 and pulses 12 are applied on two of its inputs, but no pulse is applied at its third input. The output derived is a gate 11. Characteristically, a mixing unit will produce an output signal whenever any of the input signals exist and will pass a gate if both a gate and a pulse are contemporaneously applied.

Convenient realization of a mixing unit is by diode circuitry wherein diodes 15 have their plates 18 arranged for application of the input signals. The cathodes 17 are connected in common to one side of resistor 26 which has its other side grounded. Again the output is derived from the common connection of the diodes. Assuming that both the input gate 11 and pulse 12 have the same peak potential V, the output gate 11 will likewise have a peak potential V and will have a shape corresponding to the input gate. The mixing unit thus serves as a junction between the input lines and the output line while isolating the input lines from one another.

Figure 2:
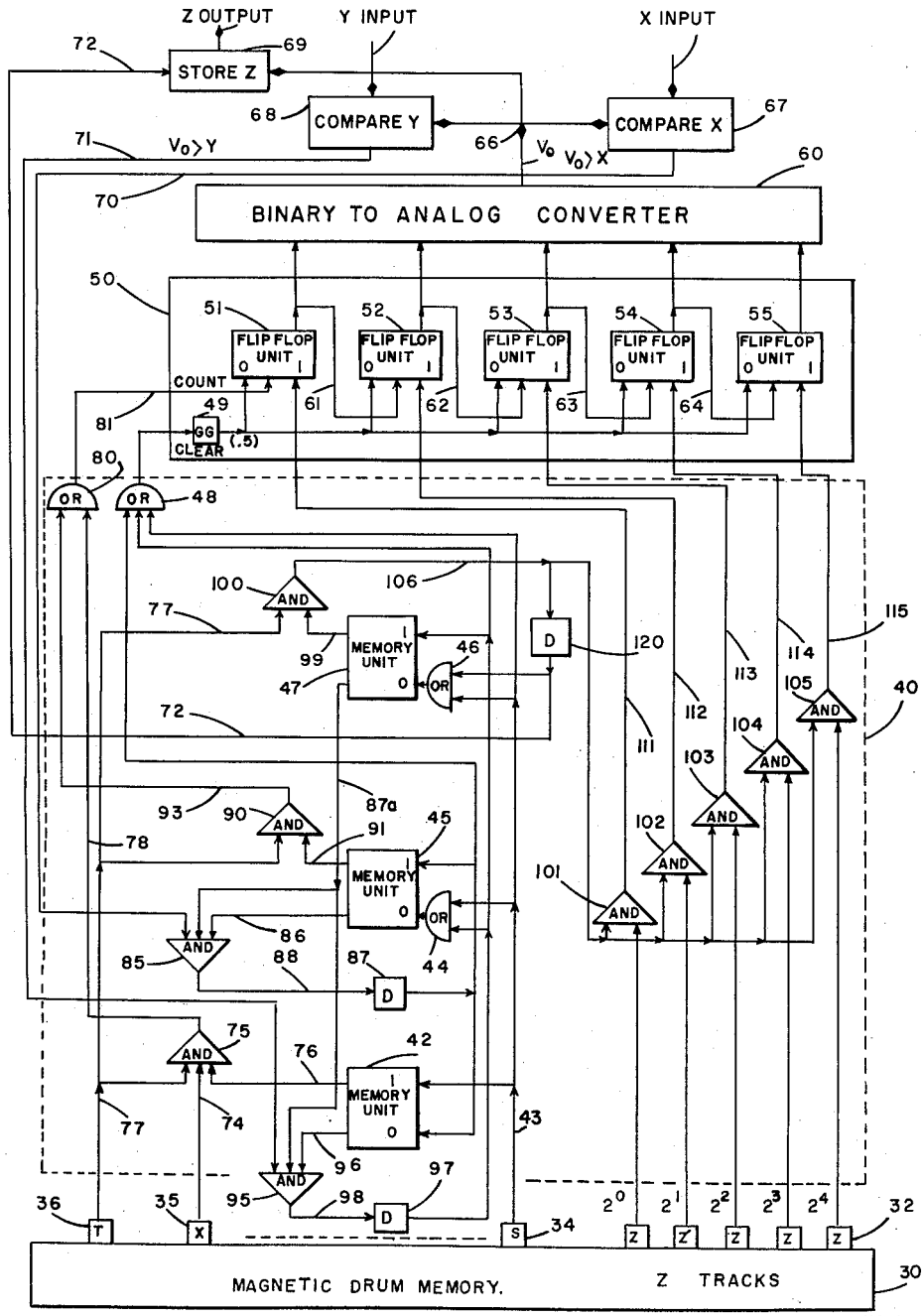
FIG. 2 is a logical diagram schematically illustrating a system for function generation in accordance with the invention.

In accordance with the principles of this invention, there is provided in FIG. 2 a system for translating an input signal $x$ and an input signal $y$ into an output signal $z$ determined by a function stored in a magnetic drum memory 30.

The input signals $x$ and $y$ will characteristically be analog in form, that is, varying in amplitude in a manner significant of value. Similarly, the output signal is provided in analog form. For accuracy and convenience in representation, however, the output values are stored in the system as binary code groups. That is, they are represented by two-state conditions, namely, the presence or absence of a recorded pulse (or the polarity of a recorded pulse) at a point on the drum 30.

While either the simple binary code or another permutation coded system of notation may be employed to establish a correspondence of binary and analog values, the former is herein employed to facilitate an understanding of the invention. In this system, a binary value may be expressed as a "word" having one or more digit places. A five place word may be expressed as 11111, for example, having an analog value of $2^4$ plus $2^3$ plus $2^2$ plus $2^1$ plus $2^0$, or 31. The powers of two thus correspond with the digit places and are present in the analog value when a 1 is present in the digit place.

To store a function table of $z$ values expressed as five place binary words, pulse patterns are magnetically recorded in five $z$ tracks, the first track bearing the symbol $2^0$ having the first place digits and the succeeding tracks labeled $2^1$, $2^2$, $2^3$ and $2^4$ containing digits of the remaining four places. The pulses are recorded in a sequence such that reading-recording heads 32 will simultaneously respond to the recorded representations of the five digits of a binary word representing the function value for a given angular position of the drum. This response may be characterized as a parallel read-out of the $z$ value.

For ease of locating a given binary number relative to the angular position of the drum, the angular positions of the words are coordinated first by large equal increments of angle corresponding to succesive values of the $x$ input and then, within each large increment, by smaller equal increments representing a full succession of values taken by the $y$ input. The significance of this ordering of the binary words represented by the recorded patterns in the $z$ tracks will be made more apparent hereafter.

It may be observed, however, that the coordination is accomplished by permanently recording indexing pulses arranged in an $x$ track and a timing or $y$ track. As a reference, a single pulse is recorded in a start track, which precedes the first of 31 pulses in the $x$ track in one interval. At every interval a pulse is recorded in the timing track commencing after the interval in which the start pulse is recorded, there being 32 timing pulses for each $x$ pulse. The recording pulses of the timing track afford not only an angular indexing of the drum periphery to corresponding with $y$ values but also a time synchronization of operations in the system.

For scanning the start track, the $x$ track and the timing track, reading heads 34, 35 and 36, respectively, are provided. These reading heads 34, 35 and 36 are angularly positioned relative to the drum to read corresponding portions of the associated tracks synchronously with the reading of pulses recorded on the $z$ tracks by the heads 32.

Associated with the reading heads 34 and 36 may be amplifiers with suitable shaping circuits (not shown) arranged in a well-known manner to provide a properly shaped pulse when a "1" pulse is scanned in the associated track. Gate generators (not shown) associated with similar amplifier-shapers may be coupled to the $z$ track reading heads 32 and $x$ track head 35 to provide a gate whenever a "1" pulse is read. The gates thus provided have a duration somewhat less than the basic timing or clock interval established by pulses from the timing head 36.

Pulses and gates derived from the reading heads associated with the magnetic drum memory 30 are furnished to a controller 40 which programs the operation of the system in accordance with the functioning of a logical net. The control cycle, as determined by the controller, proceeds in three major steps, namely, (1) counting $x$ track pulses until their value exceeds the $x$ input signal, (2) counting $y$ pulses from the timing track until their value exceeds the $y$ input signal, and (3) reading out the $z$ track pulses at the located $x$—$y$ position to determine the value of the analog output signal.

Considering now this logical net in detail, the reading head 34 is connected to the "1" input of a first memory unit 42 by a line 43. A memory unit has the function of "remembering" by its state which of its inputs "0" or "1" received the last pulse. It has two outputs corresponding respectively to a 0 and a 1 input, which supply a gate alternatively dependent upon the state of the memory unit. Thus, if the 1 input is pulsed, the 1 output will supply a gate until the 0 input is pulsed. In a well known manner, a memory unit may comprise a bistable multivibrator having separate inputs and outputs for its two electron tubes.

The start track reading head 34 is also coupled through a mixing unit 44, constructed like the mixing unit 25 of FIG. 1B, to the 0 input of a second memory unit 45. Similarly, the start track reading head 34 is connected through mixing unit 46 to the 0 input of a third memory unit 47.

As it is the function of the start track reading head 34 to provide a pulse which conditions the system for commencement of a fresh cycle, the head 34 is also coupled through a mixing unit 48 to a gate generator 49 serving to clear a binary counter 50 with which it is associated. It will be understood that the gate generator 49 serves to produce a gate (of one-half interval, for example) when it receives a pulse and, accordingly, may be a monostable multivibrator. The gate generator 49 is coupled to the respective 0 inputs of five flip-flop units 51, 52, 53, 54 and 55. These flip-flop units 51–55 are similar to the above-described memory units and may likewise be bistable multivibrators. However, each is provided with a third input indicated between the 0 and 1 input lines which, when pulsed, causes the flip-flop to change its condition from one state to the other, or to "turnover." This third or counting input may comprise a mixed input to the control electrodes of the multivibrator electron tubes, whereas the 0 and 1 inputs constitute separate inputs to these electrodes.

The five flip-flop units 51–55 have outputs by which they are coupled to a binary-to-analog converter 60. In addition, carry lines 61, 62, 63 and 64 couple the "1" output of each flip-flop unit to the counting input of the next succeeding flip-flop unit through a differentiating circuit (not shown) of well known form such that a pulse is carried by the carry line only upon transition of the associated flip-flop unit from its "1" state to its "0" state. A generation of pulses on the carry lines 61–64 will not, however, obstruct the clearing of the counter by a gate from the gate generator 49, as the gate provided for clearing the counter is of sufficient duration to allow the carry pulses to subside. For example, the gate may extend for one-half the basic timing interval established by the recurrence of timing pulses.

The binary-to-anolog converter 60 may be of any convenient design that produces a D.-C. output voltage having a magnitude proportional to the binary input value. Suitable types are commercially available. The anolog character of its single output signal is indicated by the diamond shaped arrowhead 66. This anolog output of the converter is furnished to a comparing circuit 67 which receives the $x$ input signal, to a comparing circuit 68 which receives the $y$ input signal and to a storing circuit 69 from which the output signal $z$ is derived. In the illustrated embodiment of the invention, the converter 60 generates an analog output signal related to the five place binary number represented by its input signals in accordance with the classical system of binary numeration, earlier described.

The comparing circuits 67 and 68 serve to supply an overflow or compare pulse on their output lines 70, 71 whenever the output of the converter 60 exceeds the corresponding $x$ or $y$ input value. To this end, each comparing circuit may comprise a diode comparison circuit feeding an amplitude discriminator such as a blocking oscillator, whereby to trigger the same for production of a compare pulse. Each compare pulse, as will appear hereafter, shifts the control cycle to its next phase of operation. A suitable form of comparing circuit is described in greater detail on pages 5–8 and 5–9 of a textbook entitled Notes On Analog-Digital Conversion Techniques, edited by Alfred K. Susskind and published jointly by The Technology Press of Massachusetts Institute of Technology and John Wiley & Sons, Inc., New York. The storing circuit 69, on the other hand, serves to store the output signal $V_O$ of the converter 60 which was determined to correspond with the $x$ and $y$ input signals in the last completed cycle. The value of the signal stored is that which is supplied from the converter 60 at the instant a pulse is received over line 72 coupling with the storing circuit 69. A suitable form of storing circuit is described on pages 5–62 and 5–63 of the above-mentioned textbook edited by Susskind.

The $x$ track reading head 35, which generates a first pulse one interval after the pulse supplied by the start track reading head 34, provides a gate output which is directed to the input of a first coincidence unit 75 similar in construction to the coincidence unit 10 of FIG. 1A. A second input to the coincidence unit 75 is from the 1 output line 76 of memory unit 42. A third input is coupled to line 77 carrying synchronizing or clock pulses from the timing track reading head 36. The output line 78 of the coincidence unit 75, which carries a pulse upon coincidence of gates on lines 74 and 76 and a pulse on line 77, is coupled to one input of a mixing unit 80 similar to the mixing unit 48 except in lacking a third input. Output line 81 from the mixing unit 80 is, in turn, coupled to the counting input of the first flip-flop unit 51 for the binary counter 50. Hence, the circuit which includes reading head 35, coincidence unit 75 and mixing unit 80 together with connecting lines 74, 78 and 81 constitutes a circuit for counting $x$ track pulses in synchronism with timing track pulses when gated open by the 1 output of memory unit 42.

Line 70 which carries the overflow pulse from the $x$ comparing circuit 67 is coupled to a second coincidence unit 85 having two other inputs. One of the other inputs is coupled by line 86 to the 0 output of the second memory unit 45. The remaining input is coupled by line 87a to the 0 output of the third memory unit 47. The output of the coincidence unit 85 is coupled by line 88 through a delay unit 87 affording a short delay, for example 0.2 the basic timing interval between timing pulses from reading head 36, to the 0 input of the first memory unit 42, to the 1 input of the second memory unit 45, and to the counter clearing circuit 48, 49. The delay unit 87 may be of any suitable type, such as an artificial transmission line, a monostable multivibrator or other device for creating a predetermined time interval between received and transmitted pulses.

The 1 output of memory unit 45 is coupled to a third coincidence unit 90 through line 91. The other input of the coincidence unit 90 is coupled by line 77 to the reading head 36 to receive synchronizing pulses derived from the timing track. The output of the coincidence unit 90 is coupled by line 93 through the mixing unit 80 to the counting input line 81 of the binary counter 50. Thus, a second counting circuit is provided which includes the timing track reading head 36, the coincidence unit 90, the mixing unit 80, and connecting lines 77, 93 and 81. In accordance with the operation of the device to be described hereinafter, this counting circuit permits an indexing of the $z$ track pulse patterns in accordance with the $y$ input within the interval corresponding to the $x$ input.

The $y$ comparing circuit 68 is connected by line 71 to the input of a fourth coincidence unit 95 having two other inputs. One such input is connected by line 87a to the 0 output of memory unit 47 and the other is connected by a line 96 to the 0 output of the first memory unit 42. The output of the coincidence unit 95 is coupled through a delay unit 97, similar to the delay unit 87, by a line 98 to an input of the mixing unit 44, to the 1 input of the third memory unit 47, and to an input of the mixing unit 48.

The 1 output of memory unit 47 is coupled by line 99 to a fifth coincidence unit 100 having a second input coupled to line 77. The output of the coincidence unit 100 is directly coupled to an input of each of five coincidence units 101–105 by line 106. Each of these coincidence units 101–105 has a second input coupled to the $z$ chart reading heads 32 in correspondence with digit place represented by the associated $z$ tracks. The outputs of the coincidence units 101–105 are coupled respectively to the 1 inputs of flip-flops 51–55 in the binary counter 50 by the corresponding lines 111–115. The parallel circuits from the $z$ track reading heads 32 through the coincidence units 101–105 to the flip-flops 51–55 provide a parallel entry of the binary value read from the $z$ tracks into the counter and, as will hereafter be explained, cause production of an analog output voltage $V_O$ by converter 60 which is applied to the storing circuit 69.

To effect storage of the proper $V_O$ value in the circuit 69 and to prepare the system for a succeeding cycle, the output line 106 of the coincidence unit 100 is coupled through a delay unit 120 to the line 72 and to an input of mixing unit 46. Delay unit 120, like units 87 and 97, provides a 0.2 basic timing interval pulse delay.

In operation, variable $x$ and $y$ input signals are applied respectively to the comparing circuits 67 and 68, while the magnetic drum 30 is rotated, preferably at a constant speed. When the single pulse of the start track comes under the reading head 34, a pulse is generated which sets the memory units 42, 45, 47 from their initial state 000 into the state 100 for a first mode of operation. This pulse also causes the gate generator 49 to supply a clearing gate to the 0 inputs of the flip-flops 51–55. At the commencement of a cycle, then, the coincidence unit 75 is supplied with a gate over line 76 in readiness for gating open the $x$ counting circuit and the coincidence unit 85 is gated open to pass an overflow pulse from line 70 whenever the output potential $V_O$ of the converter 60 exceeds the value of the $x$ input signal. All the other coincidence units are conditioned to gate closed their respective circuits. Clearing of the binary counter 50 yields a binary output of 0 and hence a converter output of 0.

After this initial condition is reached, a first gate is derived from the $x$ track reading head 35 which gates open the coincidence unit 75 to the synchronizing clock pulse derived from the timing track reading head 36. This first $x$ clock pulse is supplied to the input counting line 81 of the binary counter to turn over the flip-flop unit 51 from its 0 state to its 1 state. The counter then contains the binary number 00001, and the output of the converter 60 is an analog signal of one unit, such as one volt. Should the $x$ input value be less than this magnitude, a pulse would be produced by the comparing circuit 67 on line 70 for coupling to the input of coincidence unit 85. Let it be assumed, however, that additional pulses on the $x$ track must be counted before the $x$ input signal is exceeded. Each succeeding pulse representing the location of a major angular increment on the drum coordinating the position of the $z$ values causes the first flip-flop unit 51 to turn over. When it turns over from one to zero, a carry pulse is supplied over line 61 to the counting input of the second flip-flop unit 52. Carries are similarly effected between the second and third flip-flop units 52, 53 and those following. The binary value thus registered in the counter 50 is continuously translated into an analog signal $V_O$ which is supplied by the converter 60 to the $x$ comparing circuit 67.

When the overflow pulse is generated by the comparing circuit 67 on the line 70, it is gated through the coincidence unit 85 to the delay unit 87. After an 0.2 timing pulse interval a pulse is derived from the delay unit 87 which sets the memory unit 45 in its 1 state and clears the binary counter. This pulse also sets the memory unit 42 over to its 0 state, whereby not only is the coincidence unit 90 gated open but also, since both memory units 42 and 47 are in their zero states, the coincidence unit 95 is gated open.

Thus, the x track pulse counting circuit is closed and a timing pulse counting circuit is opened through a coincidence unit 90 for a second mode of operation. When the new count in the counter 50 reaches a value exceeding the input variable $y$, an overflow pulse is generated on line 71 which is gated through coincidence unit 95 to the delay unit 97. A pulse is derived from this delay unit 97 after a 0.2 timing pulse interval which sets the memory units 42, 45 and 47 over to a 001 state and clears the counter. In this third mode of operation, the 1 output of memory unit 47 gates open the coincidence unit 100.

Accordingly, the first timing pulse after the overflow pulse is derived from the $y$ comparing circuit 68 is gated through the coincidence unit 100 to the coincidence units 101–105 in the $z$ read-out circuit. In dependence upon the presence or absence of gates derived from the $z$ track reading heads 32, this timing pulse will be gated through the coincidence units 101–105 in a corresponding pattern to register in the counter 50 the binary value of $z$. The counter 50 supplies this binary value in parallel form to the converter 60, from which is derived a corresponding analog voltage $V_O$. The analog voltage $V_O$ is directed to the storing circuit 69 and is stored therein when the pulse gated through coincidence unit 100 emerges from the delay unit 120. The indicated 0.2 timing pulse interval of delay afforded by the unit 120 allows a sufficient time for readout of the $z$ value and its application in analog form to the storing circuit 69. The delay unit 120 also retards turnover of the memory unit 47 to its 0 state to prevent clipping the tail of the pulse passing from line 77 through the coincidence unit 100.

With the storing of the $z$ value, the system is restored to a condition in readiness for reading of the next start pulse by the head 34. In programming the sequence of system operations, the memory units will be observed to have the function of both recalling and determining the mode of operation. Thus, when the three memory units are in the respective states 100 after application of the start pulse, the system is conditioned for counting $x$ pulses and is receptive to an overflow pulse from the comparing circuit 67. When the overflow pulse is received on line 70, the memory units are converted to the states 010 and the binary counter is cleared. The mode of operation is then a counting of time pulses while receptive to an overflow pulse from the $y$ comparing circuit 68. Upon receipt of this overflow pulse which indicates location of a $z$ value corresponding to the $x$ and $y$ input values, the $z$ value is read out and stored in the storing circuit 69. With the storing of the $z$ value, the states are 000 and the system is placed in readiness for its next cyclic operation.

Noteworthy is the time sharing use of the binary-to-analog converter, first to locate $z$ values corresponding to the input $x$ value, then to locate a particular $z$ value corresponding to the input $y$ value, and thereupon to convert the binary $z$ value into its analog form. Recognizing that a converter commonly is of substantial expense relative to other components in this type of system and has appreciable bulkiness, time sharing use effects both a saving in cost and in size for the system.

Since the degree of accuracy with which analog signals may be transformed into a functionally dependent analog signal depends upon the degree of quantization of the analog quantities, a higher degree of quantization of the variables $x$, $y$ and $z$ may be desired as, for example, a quantization into substantially $2^7$ or 128 parts. To obtain this increase in achievable accuracy with the system shown in FIG. 2 would require a magnetic drum on the order of 40 inches in diameter. Such a size is impractical from a manufacturing standpoint and from the standpoint of reasonable access time. Accordingly, provision is made in the system diagrammatically portrayed in FIG. 3 for using four sets of seven $z$ tracks each, the sets being arranged in side-by-side relationship. In this manner, a magnetic recording drum 30a may be utilized which is of practical dimensions, for example, approximately 11 inches in diameter and 4½ inches long.

Figure 3:
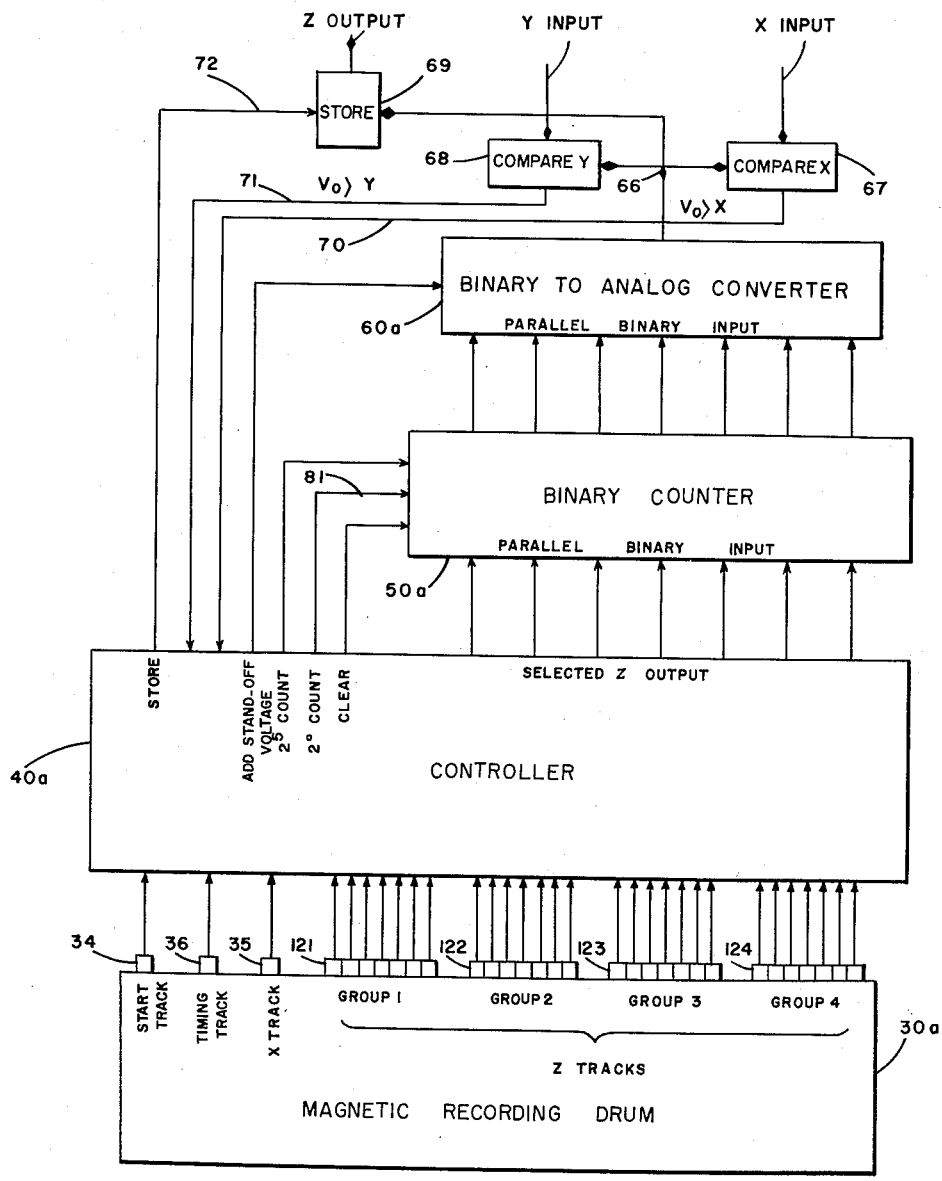
FIG. 3 is a block diagram illustrating another embodiment of the invention, also using a magnetic recording drum.

The magnetic recording drum 30a carries four sets of $z$ track reading heads 121, 122, 123, and 124 with seven heads in each set. As seen in FIG. 3, these heads 121–124 supply gate outputs to controller 40a which functions to select the outputs from one set of reading heads for transmission to the binary counter 50a as a parallel binary input thereto. The output of the binary counter is coupled in parallel to a binary-to-analog converter 60a which supplies an analog potential $V_O$ to the compare circuit 67, 68 and store circuit 69 described previously in conjunction with FIG. 2.

The compare circuits 67, 68 and store circuit 69 may be the same in the two embodiments but less accuracy is required with a lesser degree of quantization.

Figure 4:
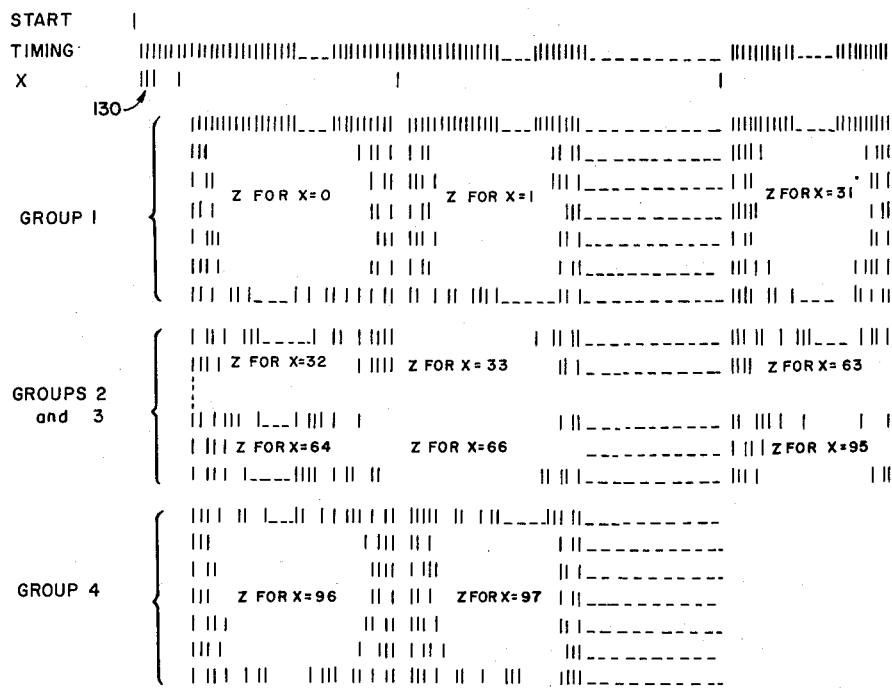
FIG. 4 is a diagram illustrating, by development of the drum periphery, the pulse pattern recorded for the system of FIG. 3 with portions cut away for convenience in representation.

While the specific pattern of pulses recorded in the $z$ tracks of the drum 30a will vary in dependence upon the function table or other information recorded on the drum, the recordings in the $x$ track, timing track and start track conveniently have a fixed pattern illustrated in FIG. 4. As the spaces between the recorded pulses of the timing track may be taken as the basic interval for the recorded pulse pattern, the positions of the other pulses are given in relation to the timing track pulses. Thus, the single pulse in the start track is one pulse interval ahead of the first pulse in the timing track. Three initial pulses indicated at 130 in the $x$ track coincide with the first, second and third pulses in the timing track. As will appear more clearly hereafter, these three pulses 130 together with the start track pulse serve for a preliminary selection of the $z$ track group from which may be derived a $z$ value corresponding to the particular $x$ and $y$ input signals. Four intervals following the last of the three pulses 130 is the first regular pulse in the $x$ track identifying the $z$ values associated with the first quantized value of $x$, namely, $x$ equal to zero. Between the first and the second regular $x$ track pulses, and each succeeding $x$ track pulse, are 128 timing track pulses, the first 127 of which identify $z$ values corresponding to 127 quantized values of $y$ beginning with zero. So that the four groups of $z$ tracks may include $z$ values for each of 127 quantized values of $x$, there are 32 regular $x$ track pulses. In the fourth $z$ track group, no pulses are recorded corresponding to the last $x$ track pulse since this last pulse will set the counter 50a back to zero.

Actually, to accommodate a time interval between identification of a selected $y$ value by an overflow pulse and readout of the corresponding $z$ value, the pulses in the $z$ tracks are delayed one interval relative to the corresponding timing track pulses. For example, if an overflow pulse occurs at the instant of the 127th timing pulse in an $x$ track interval, readout of the $z$ track pulses will occur simultaneously with the next or 128th timing pulse. The $x$ and $y$ inputs are thus quantized into 127 values, while the $z$ output may have 128 different values. Since four groups of $z$ tracks, seven tracks in a group, are employed together with a start track, timing track and $x$ track, it will be evident that 31 tracks are required.

Figure 5A:
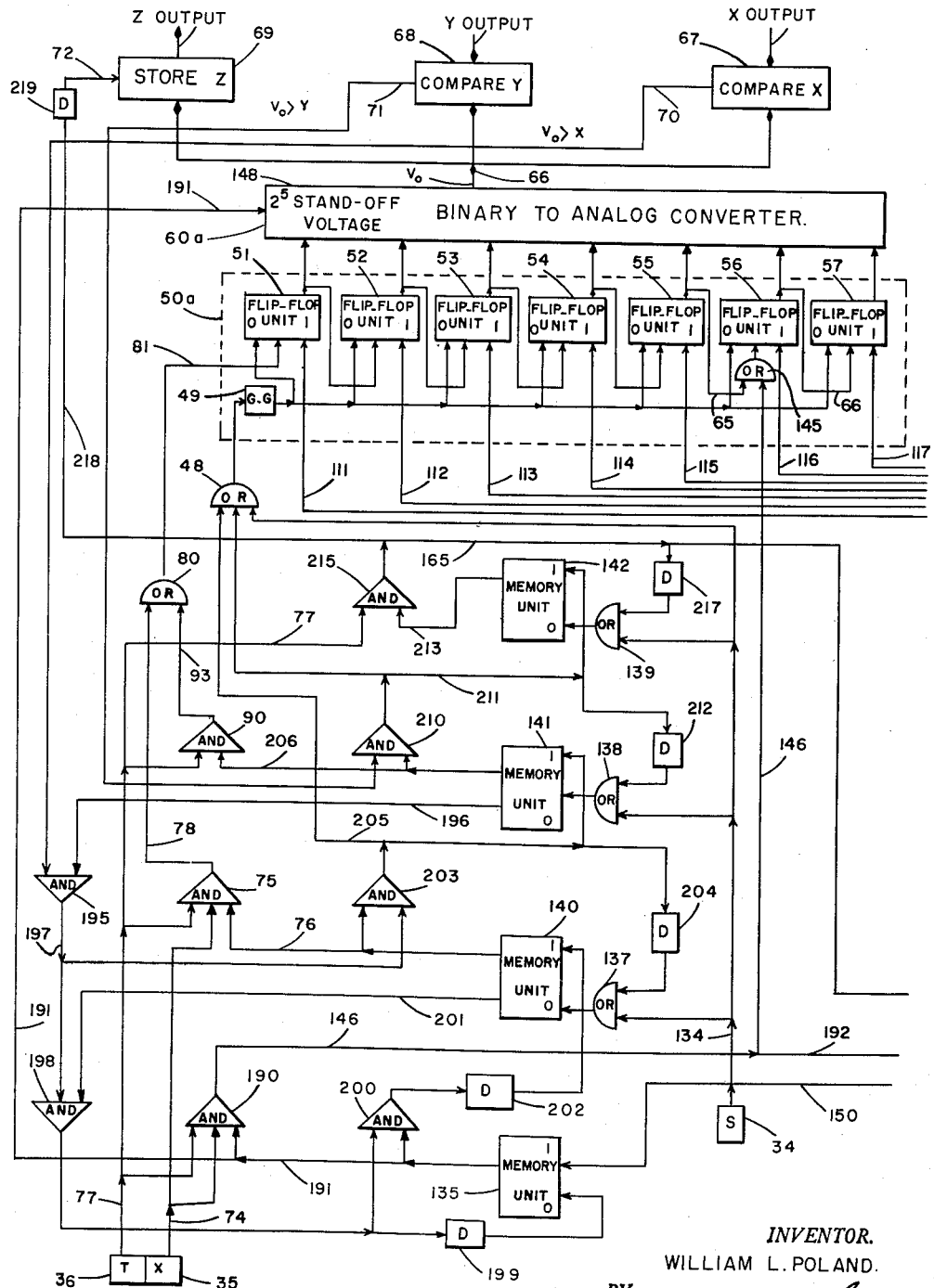
FIGS. 5A and 5B are logical diagrams schematically illustrating associated portions of the system of FIG. 3.
Figure 5B:
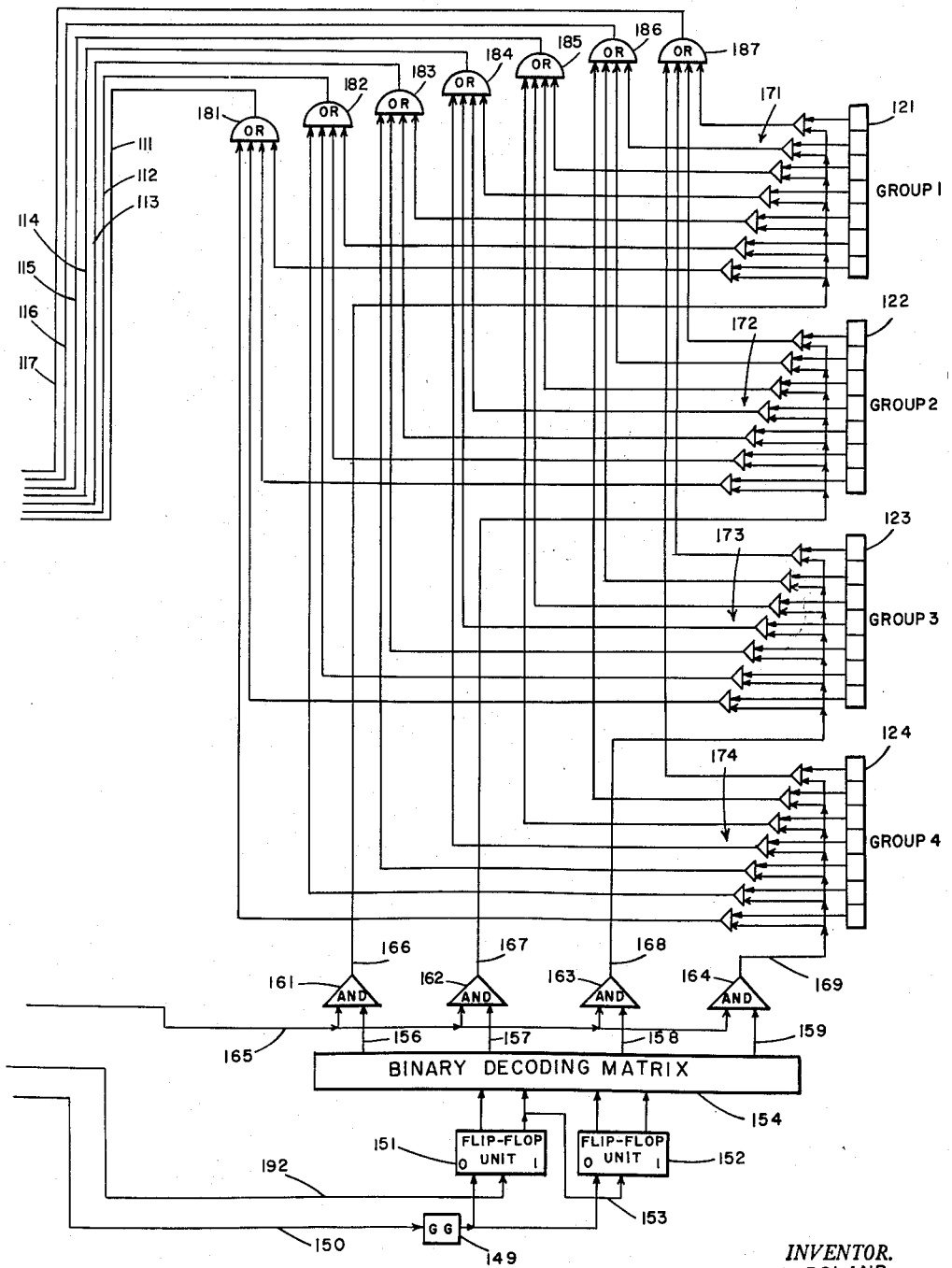

Referring now to the logical diagram of FIGS. 5A and 5B, the circuitry for selecting one of the $z$ track groups is first considered. In this circuitry, the start track reading head 34 is connected by line 134 to the 1 input of a first memory unit 135, and through mixing units 137, 138 and 139 to the respective 0 inputs of memory units 140, 141, and 142. The line 134 also connects the start track reading head 34 through mixing unit 48 to the gate generator 49. As in the previous embodiment, this gate generator 49 serves to generate a gate which is supplied to the zero inputs of each of the flip-flops 51–57 in the counter 50a. Since the values handled by this system are quantized up to the seventh power of two, the additional flip-flops 56 and 57 are required together with additional carry lines 65 and 66 from the flip-flops 55 and 56, respectively. While the carry line 66 connects directly to the counting input of the flip-flop 57, the carry line 65 is connected through a mixing unit 145 to the counting input of the flip-flop 56. Connected to the second input of this mixing unit 145 is a line 146, the purpose of which will be developed hereafter.

The 1 outputs of the flip-flop units 51–57 are coupled in parallel to the binary-to-analog converters 60a, which differs from the converter 60 of the preceding embodiment in the number of its inputs, and hence capacity, and also in the utilization of a standoff voltage. This standoff voltage is developed by a standoff voltage unit 148 which biases the converter to operate as though the binary value entered by the counter 50a was augmented by 1 in the $2^5$ place of the binary word. Since the converter is essentially a device for adding voltages weighted in accordance with the values $2^0$, $2^1$, $2^2$ and so on assigned to the places of the binary input, addition of the standoff voltage is accomplished by adding to the converter output a voltage weighted identically with the $2^5$ place binary input. A suitable form of converter which readily permits the addition of the stand-off voltage in this manner is described on pages 5–29 through 5–32 of the above-mentioned textbook edited by Susskind. The output potential $V_O$ provided by the converter 60a is coupled to comparing circuits 67 and 68 for $x$ and $y$, respectively, and to the storing circuit 69.

The start track reading head 34 is also coupled by line 150 to a gate generator 149 (FIG. 5B) which, like gate generator 49, may provide a one-half interval gate. The gate generator 149, is, in turn, coupled to the 0 input of a flip-flop unit 151 and to the 0 input of a flip-flop unit 152. The flip-flop units 151, 152 constitute, respectively, the first and second stages of a binary counter, with a carry line 153 connecting the 1 output of the flip-flop 151 to the counting input of the flip-flop 152. Both the 1 and the 0 outputs of the flip-flop units 151, 152 are coupled to a binary decoding matrix 154, which may be a conventional form of diode matrix serving to energize a selected one of its output lines 156–159 in accordance with its binary input. Specifically, the matrix 154 selects line 156 with a "00" binary input, line 157 with a "01" binary input, line 158 with a "10" binary input, and line 159 with a "11" binary input.

The output lines 156–159 from the matrix 154 are coupled, respectively, to coincidence units 161–164. Each of these coincidence units 161–164 has a second input connected to line 165. Output lines 166–169 connect to the respective inputs of four sets 171–174 of coincidence units. Each set includes seven coincidence units having second inputs coupled to the respective reading head of the associated sets 121–124 for the four track groups. In other words, the reading heads of sets 121–124 are coupled to a corresponding input of coincidence units arranged in sets 171–174 for selective gating of pulses on the lines 166–169, respectively. The seven coincidence units in each set correspond to the seven places in the binary value of $z$. In order that the binary value of $z$ may be read into the counter 50a regardless of which set of coincidence units is pulsed, the outputs of the coincidence units in sets 171–174 are distributed among the inputs of mixing units 181–187 in digit place correspondence. That is to say, the inputs to the mixing unit 181 are coupled to the outputs of the four coincidence units, one in each set, representing the first place of the binary value for $z$. The inputs to the remaining mixing units 182–187 represent the remaining second to seventh places of the binary value or word. The outputs of the mixing units 181–187 are coupled by lines 111–117, respectively, to the 1 inputs of flip-flop units 51–57 (FIG. 5A).

Turning now to further details of the controller circuitry shown in FIG. 5A by which a $z$ track group is selected, the $x$ track reading head 35 is coupled by line 74 to an input of a coincidence unit 190. Through line 77 the timing track reading head 36 is coupled to a second input of unit 190. The third input of the coincidence unit 190 is coupled by the line 191 to the 1 output of memory unit 135. The gated output of this coincidence unit 190 is, in turn, coupled by line 192 to the counting input of flip-flop unit 151 (FIG. 5B). In parallel with the output line 192 is line 146 (FIG. 5A) which couples the output to the second input of the mixing unit 145 in the binary counter 50a. Previously mentioned line 191 from the 1 output of memory unit 135 also connects with the standoff voltage unit 148 within the converter 60a.

During a comparison of the $x$ input with coarse increments of $V_O$ derived from the converter 60a, the controller is conditioned for response to an overflow pulse on line 70 from the comparing circuit 67. The line 70, therefore, connects circuit 67 with an input of a coincidence unit 195 having its second input connected through line 196 to the 0 output of memory unit 141. The output of coincidence unit 195 is coupled by line 197 to an input of a coincidence unit 198, the output of which is in turn coupled to a delay unit 199 and to an input of a coincidence unit 200. The coincidence unit 198 has its second input coupled by line 201 to the 0 output of memory unit 140. The delay unit 199, which may be set for a delay interval of 0.2 the timing pulse interval, is connected with the 0 input of memory unit 135, while the 1 output of unit 135 connects through line 191 with a second input of coincidence unit 200. Furthermore, the output of coincidence unit 200 is coupled through delay unit 202 affording a 3.5 timing pulse interval delay to the 1 input of memoroy unit 140. These various connections make possible a selection of one set of $z$ track reading heads and prepare the controller for looking up the $z$ values corresponding to the $x$-input.

To obtain a look-up of $z$ values in accordance with the $x$ input, line 74 from the $x$ track reading head 35 connects with the input of a coincidence unit 75 having an input connection to line 77 from the timing track reading head 36. Line 76 from the 1 output memory unit 140 connects with the third input of unit 75. By a connection through output line 78, mixing unit 80 and line 81 to the counting input of the first flip-flop unit 51 in the binary counter, the coincidence unit 75 serves again as a gating device in the $x$ pulse counting circuit.

For looking up the $z$ values in accordance with the $y$ input, the line 76 as well as line 197 connect with inputs of a coincidence unit 203. Connecting the output of unit 203 with the 1 input of memory unit 141, with the mixing unit 48, and also with the mixing unit 137 via delay unit 204 is a line 205. The 1 output of memory unit 141 is connected by a line 206 to an input of the coincidence unit 90, the second input being connected to the timing track head 36 via line 77. As the output of the coincidence unit 90 is coupled by line 93, mixing unit 80 and line 81 to the counting input of the binary counter 50a, the coincidence unit 90 again serves as a gating device in the counting circuit for the location of the $y$ address.

Line 71, which carries the overflow pulse from the comparing circuit 68 for the input $y$, connects with one input of a coincidence unit 210, the second input being connected to line 206. The output of this unit 210 is connected by line 211 to the 1 unit of memory unit 142, to an input of mixing unit 138 via delay unit 212, and to an input of mixing unit 48 which controls the clearing of the binary counter. The 1 output of memory unit 142 is coupled by line 213 to the input of a coincidence unit 215 having its second input coupled by line 77 to the timing track reading head 36. The output of coincidence unit 215 is coupled directly to line 165 which it will be recalled, carries a pulse to the inputs of coincidence units 161–164 (FIG. 5B) serving for selection of the $z$ track group.

Line 165 also couples the coincidence unit 215 through a delay unit 217 (FIG. 5A) and mixing unit 139 to the 0 input of memory 142. The delay unit 217 may be designed to provide a delay interval of 0.2. By a line 218 paralleling line 165, the output of coincidence unit 215 is also coupled through a delay unit 219 to the storing unit 69. A 0.5 interval of delay is provided by the unit 219 for retarding the pulses from the coincidence unit 215, until the voltage $V_O$ can attain the readout value of z.

In operation, the magnetic recording drum 30a is revolved at a fixed rate, while varying voltages are applied at the x and y input terminals of the comparing circuits 67 and 68. When the start pulse is read off the drum by the reading head 34, the memory units 135, 140, 141 and 142 are set over to the state 1000. The start pulse is also applied to gate generators 49, 149 for the seven stage binary counter 50a and the two stage binary counter 151–152, clearing both to zero. A gate derived from the 1 output of memory unit 135 sets the $2^5$ standoff voltage into the converter 60a.

If the input x signal is less than the 32nd value of its quantization, $V_O$ will exceed x and produce an overflow pulse on line 70. Assuming, however, that the x input lies between the 64th and 96th quantized value, such overflow pulse will not occur at this instant. Instead, two of the initial pulses 130 on the x track will be applied as gates to the coincidence unit 190 to gate through coincident timing pulses to the counting input of the 6th flip-flop unit 56. These timing pulses are counted as increments of $2^5$ order. In terms of quantized values of x, the output potential $V_O$ of the converter 60a thus increases from its standoff voltage output of 32 up to 64, thence to 96 units. In accordance with the previous assumption, the converter output of 96 results in the generation of an overflow pulse on line 70 by the comparing circuit 67.

It will be recalled that the start pulse set the two stage counter (FIG. 5B) over to its "00" state. Thereafter two of the three initial pulses 130 on the x track are gated through the coincidence unit 190 into the counting input of binary counter 151—152 at the same time that these two pulses are also gated into the counting input of flip-flop unit 56. The first one of the pulses sets counter 151—152 at "01" and the second pulse sets the counter at "10." Had the next succeeding pulse been gated through the unit 190, the two stage counter would have been advanced to a setting of "11." However, with a setting of "10" (identifying the x input variable as lying in the range between 64 and 96) the binary decoding matrix 154 gates open coincidence unit 163 which controls subsequent readout from the third set 123 of z track reading heads.

The overflow pulse on line 70 is then gated through coincidence units 195, 198 and 200 to the delay unit 202. The long delay of 3.5 intervals afforded by the delay unit 202 assures that all of the initial pulses 130 will be past the x track reading head 35 before the memory unit 140 is flipped over to its 1 state to start a counting of regular x pulses. The output pulse of coincidence unit 198 is also furnished through delay 199 to the zero input of memory unit 135 in order to gate closed the coincidence units 190 and 200. Thus, with the assumed value of x lying between 64 and 96 in quantized units, two of the three pulses 130 pass under the x track reading head 35 to produce the overflow pulse on line 70. When the third pulse passes under the head, the coincidence unit 190, along with coincidence units 75, 90 and 215 are gated closed, so that such third pulse has no effect on the system. It may be observed that the seven stage binary counter 50a is not cleared of the two input pulses which entered the counter prior to generation of the overflow pulse. Since these two pulses are applied to the counting input of flip-flop 56, the counter 50a will stand with a binary count of 1000000, or 64 in decimal notation. The standoff voltage in the converter 60a is terminated, however, with changing of memory unit 135 to its 0 state.

Prior to the first regular x pulse then, the overflow pulse changes the memory units 135, 140, 141 and 142 from the state 1000 to the state 0100, gating open coincidence units 75, 203, and 195. Then as each regular pulse is read out of the x track by the head 35, the coincidence unit 75 gates through a timing pulse into the counter 50a on line 81, thereby to advance the output of converter 60a from 64 upwardly toward 96. It will be recalled that the system initially determined the x input signal to have a quantized value between 64 and 96, as it was assumed to be. When the count exceeds that of the input value x, the overflow pulse is again generated in line 70. This overflow pulse is gated through coincidence units 195 and 203 first to set memory unit 141 over to its 1 state and to clear the binary counter 50a, and then after a delay 0.2 encountered in the delay unit 204 to set the memory unit 140 over to its 0 state. The delay unit 204 thus serves to prevent clipping of the tail of the pulse gated through coincidence unit 203. In this manner, the system is prepared for its third mode of operation with the memory units in the states 0010, coincidence units 90 and 210 gated open, and the counter 50a cleared.

At this point, the set of z values corresponding to the input x value has been located and a particular z value for the input y value is to be found. Coincidence unit 90 passes pulses from the timing track reading head 36 to the counter 50a to start through the entire range of 127 quantized values for the input variable y. When the y input variable is exceeded, an overflow pulse is generated by the comparing circuit 68 on the line 71 which is gated through the coincidence unit 210 both to clear the seven stage counter 50a and to set the memory unit 142 over to its 1 state. The overflow pulse is also gated by unit 210 through the 0.2 delay unit 212 to set the memory unit 141 over to its 0 state, the delay again serving to avoid pulse tail clipping. With the state of the memory units now 0001, the system is set for its fourth mode of operation, that of gating out the selected value of z from the z tracks.

In the fourth mode of operation, the next succeeding pulse on line 77 derived from the timing track reading head 36 is gated through coincidence unit 215, then through the gated open coincidence unit 163 (FIG. 5B) for application to the line 168 running to the set of seven coincidence units 173. In other words, the binary decoding matrix 154 selectively gates the pulse to the readout circuits of a particular group of z track reading heads. Since the seven coincidence units 173 correspond to the seven digit places of the binary value of z, only those units for which the binary value in the digit place is 1 will be gated open to pass the pulse on line 168 to the appropriate mixing units 181–187. Stated in another fashion, the pattern of pulses passing under the third set of reading heads 123 coincidentally with the fourth mode timing pulse is transferred into the counter 50a by a parallel read-out. This value of z, transformed by the converter 60a into an analog representation, is applied to the storing circuit 69 as a potential. The same timing pulse gated through coincidence unit 215 also traverses line 218 for application to the holding input of the storing circuit 69 after a delay of 0.5 encountered in delay unit 219. As will be evident, this delay allows the analog representation of the z value to reach the storing circuit ahead of the holding pulse.

In preparation for a subsequent cycle, the pulse gated through coincidence unit 215 also is applied through the delay unit 217 to turn the memory unit 142 over to its 0 state, leaving all of the memory units then in the 0 state.

As will be appreciated by those skilled in this art, the components of the controllers 40 and 40a may be varied and arranged in many different ways, in each of which a time sharing use of the converter is programmed. Other groupings of information in the magnetic drum memory might successfully be employed, with corresponding changes in the reading heads and associated circuitry. In lieu of a two coordinate addressing system, a three or other coordinate addressing system might profitably be employed.

The invention, therefore, is not limited to the specific embodiments which have been illustrated, but is of a scope defined in the appended claims.

I claim:
1. In a signal translating system, means for storing information in digital form, a source of timing pulses, a counter for counting and registering said timing pulses, means for converting the digital value registered in said counter into an analog signal, means for generating a compare signal when said analog signal compares in a predetermined manner to a variable input signal, and means for supplying said counter with a digital signal representative of a portion of said stored information selected in accordance with the value registered in said counter when said compare signal is generated.

2. In a signal translating system, means for storing information in a digital form, a source of timing pulses, a counter for counting and registering said timing pulses, means for converting the digital value registered in said counter into an analog signal, means for generating a compare signal when said analog signal compares in a predetermined manner to a variable input signal, means for deriving selected information from said storing means, and controller means responsive to said compare signal for supplying said counter with a digital signal representative of said selected information.

3. In a signal translating system, means for storing information in binary form, a source of timing pulses, a binary counter for counting and registering said timing pulses, means for converting the binary value registered in said counter into an analog signal, means for generating a compare signal when said analog signal compares in a predetermined manner to a variable input signal, means responsive to said compare signal for clearing said counter, means for extracting selected information from said storing means, and means for supplying said counter with a binary signal representative of the information selected when said compare signal is generated, whereby an analog signal representative of said selected information may be derived from said converting means.

4. In a signal translating system, magnetic storage means for storing information in binary form, a source of timing pulses, a binary counter coupled to said timing pulse source for counting and registering said timing pulses, means coupled to said counter for converting the binary value registered therein into an analog signal, means coupled to said converting means for generating a compare signal when said analog signal compares in a predetermined manner to a variable input signal, means responsive to said compare signal for clearing said counter, means responsive to said compare signal for extracting a portion of said stored information selected in accordance with the value registered in said counter when said compare signal is generated, and gating means coupled to said extracting means for supplying said counter with a digital signal representative of said selected portion of information.

5. In a signal translating system, means for storing information in digital form at a two coordinate address, a source of timing pulses, a counter for counting and registering said timing pulses, means for converting the digital value registered in said counter to an analog signal, means for generating a signal when said analog signal compares in a predetermined manner with a variable input signal, means for extracting a portion of said stored information selected in said two coordinates dependent upon the value registered in said counter when said compare signal is generated, and means for supplying said counter with a digital signal representative of said selected portion of information.

6. In a signal translating system, magnetic storage means for storing information in binary form at a two coordinate address, first and second source means for supplying first and second sets of timing pulses having different occurence rates, a counter for said timing pulses, means coupled to said counter for successively converting the digital value registered therein for each set of timing pulses into first and second analog signals, first means for generating a compare signal when said first analog signal compares in a predetermined manner to a first variable input signal, second means for generating a compare signal when said second analog signal compares in a predetermined manner to a second variable input signal, means coupled to said first and second signal generating means for extracting a portion of said stored information at a two coordinate address selected in accordance with the values registered in said counter when said compare signals are generated, and means coupled to said extracting means for supplying said counter with a digital signal representative of said selected information.

7. In a function generator, means for storing a function table with its entries in binary form including a source of timing pulses, a binary counter for counting and registering said timing pulses, means coupled to said binary counter for converting the binary value registered therein to an analog signal, means for generating an overflow signal when said analog signal exceeds a variable input signal, and means for supplying said counter with a binary signal representing an entry in said function table selected in accordance with the value registered in said counter when said overflow signal is generated.

8. In a function generator, a magnetic recording drum for storing a function table with its entries arranged in binary form, said drum having first and second timing tracks recorded thereon to index said entries, reading means for deriving first and second sets of timing pulses from said timing tracks, a binary counter for successively counting and registering said timing pulse sets, means coupled with said counter for converting the successive binary value registered therein into analog signals, means for generating first and second overflow signals when said analog signals exceed individual ones of two variable input signals, controller means for locating a first group of said entries in response to the first overflow signal and for selecting an entry in said located group in response to the second overflow signal, means for clearing said counter in response to each overflow signal, and means for supplying said counter with a binary signal representative of said selected entry.

9. In a function generator, a magnetic storage drum having parallel tracks of recorded pulses representing function table entries, a track of recorded pulses for indexing groups of said entries, and a recorded timing signal track for indexing each entry in said groups, a binary counter, a converter coupled to said counter for transforming a binary value registered therein into an analog signal, first and second comparing circuits coupled to said converter to supply respective overflow signals when said analog signal exceeds first and second variable input signals, and controller means for sequentially supplying said counter with group indexing pulses until a first overflow pulse is received, with entry indexing pulses until a second overflow pulse is received and with pulse signals representative of a selected entry, whereby an analog signal may be derived from said converter functionally related to said input signals.

10. In a function generator, a magnetic storage drum having parallel tracks of pulses recorded in angular relation to represent function table entries, a track of recorded pulses for indexing groups of said entries, and a track of recorded timing pulses for indexing each entry in said groups, a binary counter arranged for counting and for registering a parallel binary input, a converter coupled to said counter to convert the binary value registered thereby into an analog signal, first and second comparing circuits coupled to said converter to supply respective first and second overflow signals when said analog signal exceeds first and second variable input signals, and controller means including a first controller circuit for supplying said counter with group indexing pulses, a second controller circuit for supplying said counter with entry indexing pulses, a parallel read-out circuit for supplying said counter with a parallel binary input representative of the selected entry, and gating means for gating open said first counting controller circuit until said first overflow signal is generated, gating open said second counting controller circuit until said second overflow signal is generated and thereupon gating open said read-out circuit.

11. In a two variable function generator, a magnetic storage drum having parallel tracks of recorded pulses, said tracks being grouped to represent groups of function table entries corresponding to successive ranges of one input variable, a track of recorded pulses for indexing sets of said entries corresponding to increments of said one variable within each range, and a track of recorded timing pulses for indexing each entry in said sets in accordance with increments of a second input variable, a binary counter, a converter coupled to said counter for converting a binary value registered therein into an analog signal, means for supplying first and second variable input signals, first and second comparing circuits coupled to said converter and to said signal supply means to supply respective overflow signals when said analog signal exceeds said first and second variable input signals, means for stepping said counter in coarse increments to carry said analog signal through said ranges of said one variable until an overflow pulse is derived from said first comparing circuit, means for returning said analog signal to the coarse increment next preceding the range in which said one input variable lies, means for supplying said counter with indexing pulses corresponding to said one variable until an overflow pulse is derived from said first comparing circuit, means for supplying said counter with timing pulses corresponding to said second variable until an overflow pulse is derived from said second comparing circuit and means for supplying said counter with pulse signals representative of the entry in the selected group, set, and increment.

12. In a function generator, a magnetic drum storage including a drum having entries of a function recorded in binary form thereon in groups of parallel tracks, said groups of tracks corresponding to successive ranges of an input variable, a track of recorded pulses for indexing said entries for each of said track groups, a binary counter, a converter for transforming a binary value in said counter into an analog signal, means for supplying a variable input signal, a comparing circuit coupled to said converter and to said signal supply means to supply an overflow signal when said analog signal exceeds said variable input signal, means coupled with said counter for stepping the analog signal of said converter through the successive ranges of said input variable until an overflow signal is derived, means including a selector matrix for selecting for readout the track group corresponding to the range in which said overflow pulse was derived, means for supplying said counter with indexing pulses until a second overflow pulse is derived, and means coupled with said counter for setting the analog signal from said converter at a value corresponding to an entry in the selected group indexed by the second overflow pulse.

13. In a signal translating system including a memory device for storing information in digital form, a source of timing pulses, a counter for counting and registering said timing pulses, means for converting the digital value registered in said counter into an analog signal, means for generating an overflow signal when said analog signal compares in a predetermined manner to a variable input signal, means for locating a portion of said stored information selected in accordance with the value registered in said counter when said overflow signal is generated, and means coupled with said memory device for supplying said counter with a digital signal representative of said selected information.

14. In a signal translating system including a memory device for storing information in binary form, a binary counter for counting and registering pulses, means for converting the binary value registered in said counter into an analog signal, means for supplying said counter with series indexing pulses, means for generating an overflow signal when the analog signal resulting from the indexing pulses exceeds a variable input signal, means responsive to the overflow signal for supplying to said counter a parallel digital signal representative of information stored in said memory device, and means responsive to the overflow signal for storing the analog signal resulting from said digital signal.

References Cited in the file of this patent
UNITED STATES PATENTS

| | | |
|---|---|---|
| 2,539,623 | Heising | Jan. 30, 1951 |
| 2,540,654 | Cohen | Feb. 6, 1951 |
| 2,580,768 | Hamilton | Jan. 1, 1952 |
| 2,679,638 | Bensky | May 25, 1954 |
| 2,700,750 | Dickinson | Jan. 25, 1955 |
| 2,715,678 | Barney | Aug. 16, 1955 |
| 2,754,503 | Forbes | July 10, 1956 |
| 2,787,418 | MacKnight et al. | Apr. 2, 1957 |
| 2,843,841 | King et al. | July 15, 1958 |
| 2,865,564 | Kaiser et al. | Dec. 23, 1958 |

FOREIGN PATENTS

| | | |
|---|---|---|
| 1,097,215 | France | Feb. 16, 1955 |

OTHER REFERENCES

Convention Record of the March 23–26, 1953, I.R.E. National Convention; "An Analog-To-Digital Converter With an Improved Linear Sweep Generator" (Slaughter).